United States Patent
Moniz et al.

(10) Patent No.: US 10,133,652 B2
(45) Date of Patent: *Nov. 20, 2018

(54) DEBUGGING OPTIMIZED CODE USING FAT BINARY

(71) Applicant: International Business Machines Corporation, Armonk, NY (US)

(72) Inventors: Michael J. Moniz, Ottawa (CA); Ali I. Sheikh, Sunnyvale, CA (US); Diana P. Sutandie, Markham (CA); Srivatsan Vijayakumar, Ottawa (CA); Ying Di Zhang, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,317

(22) Filed: Sep. 15, 2017

(65) Prior Publication Data

US 2017/0371767 A1 Dec. 28, 2017

Related U.S. Application Data

(63) Continuation of application No. 15/043,667, filed on Feb. 15, 2016.

(51) Int. Cl.
  *G06F 9/44* (2018.01)
  *G06F 11/36* (2006.01)
  (Continued)

(52) U.S. Cl.
  CPC ............ *G06F 11/3624* (2013.01); *G06F 8/41* (2013.01); *G06F 8/53* (2013.01)

(58) Field of Classification Search
  CPC .................................................. G06F 11/3624
  (Continued)

(56) References Cited

U.S. PATENT DOCUMENTS

| 5,761,477 A * | 6/1998 | Wahbe | ............... G06F 11/3624 |
| | | | 714/E11.211 |
| 6,151,618 A * | 11/2000 | Wahbe | ............... G06F 11/3624 |
| | | | 714/E11.211 |

(Continued)

FOREIGN PATENT DOCUMENTS

| JP | 5589670 B2 | 9/2014 |
| JP | 5636783 B2 | 12/2014 |

OTHER PUBLICATIONS

Drinic et al, "Code optimization for code compression" IEEE, pp. 315-324, 2003.*

(Continued)

*Primary Examiner* — Anil Khatri
(74) *Attorney, Agent, or Firm* — Gilbert Harmon, Jr.

(57) ABSTRACT

Embodiments of the present invention provide a method, computer program product, and system for debugging optimized code. The system includes a FAT binary, wherein the FAT binary comprises a non-optimized native code and an internal representation of a program's source code. An optimus program is configured to transform the internal representation of the program's source code into a fully optimized native code. The system also includes an enhanced loader, wherein the enhanced loader is configured to communicate with a debugger to determine a type of code to load.

1 Claim, 3 Drawing Sheets

(51) Int. Cl.
*G06F 8/41* (2018.01)
*G06F 8/53* (2018.01)

(58) Field of Classification Search
USPC .............. 717/120–129, 140–141, 150–151
See application file for complete search history.

(56) References Cited

U.S. PATENT DOCUMENTS

| | | | | |
|---|---|---|---|---|
| 6,263,489 | B1* | 7/2001 | Olsen | G06F 11/3628 |
| | | | | 714/E11.209 |
| 6,314,558 | B1* | 11/2001 | Angel | G06F 11/3612 |
| | | | | 714/35 |
| 6,314,562 | B1* | 11/2001 | Biggerstaff | G06F 9/451 |
| | | | | 717/156 |
| 6,405,364 | B1* | 6/2002 | Bowman-Amuah | G06F 8/20 |
| | | | | 717/101 |
| 6,434,741 | B1* | 8/2002 | Mirani | G06F 11/3628 |
| | | | | 714/E11.209 |
| 6,513,155 | B1* | 1/2003 | Alexander | G06F 11/3409 |
| | | | | 717/124 |
| 6,536,037 | B1* | 3/2003 | Guheen | G06F 8/71 |
| | | | | 703/2 |
| 6,553,565 | B2 | 4/2003 | Click, Jr. et al. | |
| 6,560,774 | B1* | 5/2003 | Gordon | G06F 9/44589 |
| | | | | 717/114 |
| 6,634,023 | B1* | 10/2003 | Komatsu | G06F 8/445 |
| | | | | 717/124 |
| 6,658,471 | B1* | 12/2003 | Berry | G06F 11/3466 |
| | | | | 709/224 |
| 7,024,660 | B2* | 4/2006 | Andrade | G06F 11/263 |
| | | | | 714/25 |
| 7,085,670 | B2* | 8/2006 | Odom | G06F 9/4411 |
| | | | | 702/127 |
| 7,607,123 | B2 | 10/2009 | Chavan | |
| 7,823,129 | B2* | 10/2010 | Dimpsey | G06F 11/3466 |
| | | | | 717/124 |
| 8,615,743 | B2* | 12/2013 | Miller | G06F 11/3624 |
| | | | | 713/156 |
| 8,615,750 | B1* | 12/2013 | Narayana Iyer | G06F 11/3624 |
| | | | | 709/203 |
| 8,683,453 | B2* | 3/2014 | Patel | G06F 9/44521 |
| | | | | 717/139 |
| 8,762,964 | B2* | 6/2014 | Turner | G06F 8/314 |
| | | | | 707/713 |
| 8,997,049 | B1 | 3/2015 | Melnikov et al. | |
| 9,021,454 | B2* | 4/2015 | Yohn | G06F 9/4552 |
| | | | | 712/226 |
| 9,058,483 | B2* | 6/2015 | Chen | G06F 21/577 |
| 9,940,218 | B2* | 4/2018 | Moniz | G06F 11/3624 |
| 2011/0271259 | A1 | 11/2011 | Moench et al. | |
| 2014/0289707 | A1 | 9/2014 | Guan et al. | |
| 2015/0378871 | A1 | 12/2015 | Asthana et al. | |

OTHER PUBLICATIONS

Kamin et al, "Jumbo: Run-time Code Generation for Java and Its Applications", IEEE, pp. 48-56, 2003.*
Grimmer et al, "An Efficient Native Function Interface for Java", ACM, pp. 35-44, 2013.*
Sulliva et al, "Dynamic Native Optimization of Interpreters" ACM, 50-57, 2003.*
Hsieh et al, "Java Bytecode to Native Code Translation: The Caffeine Prototype and Preliminary Results", IEEE, pp. 90-97, 1996.*
Shi et al, "An Intermediate Language Level Optimization Framework for Dynamic Binary Translation", ACM, pp. 3-9, 2007.*
Anand et al, "A Compiler-level Intermediate Representation based Binary Analysis and Rewriting System", ACM, pp. 295-308, 2013.*
Hölzle et al., "Debugging Optimized Code with Dynamic Deoptimization", ACM SIGPLAN '92 Conference on Programming Language Design and Implementation, San Francisco, Jun. 1992, pp. 1-12.
Jaramillo, "debugging optimized code", Printed Dec. 9, 2015, 1 page, <http://people.cs.pitt.edu/~cij/debug2.html>.
Kedlaya et al., "Deoptimization for Dynamic Language JITs on Typed, Stack-based Virtual Machines", VEE '14, Mar. 1-2, 2014, 12 pages, © 2014 ACM, Salt Lake City, Utah, USA.
Seaton et al., "Debugging at Full Speed", Dyla'14, Jun. 9-11, 2014, 13 pages, Copyright 2014 ACM, Edinburgh, United Kingdom.
Silvera et al., "Debugging Optimized Code With the Latest IBM XL C/C++ and XL Fortran Compilers", IBM Systems Magazine, e-Newsletter Exclusive, Dec. 2012, 5 pages, <http://www.ibmsystemsmag.com/CMSTemplates/IBMSystemsMag/Print.aspx?path=/aix/tipstechniques/applicationdevelopment/debug_xl_compilers>.
"Appendix P: List of IBM Patents or Patent Applications Treated as Related", 2017, pp. 1-2.
U.S. Appl. No. 15/043,667, filed Feb. 15, 2016 Entitled "Debugging Optimized Code Using FAT Binary"; 18 pages.

* cited by examiner

DEBUGGING OPTIMIZED CODE USING FAT BINARY

BACKGROUND OF THE INVENTION

The present invention relates generally to the field of static language debugging, and more particularly to using a FAT binary to efficiently debug optimized code without the need to rebuild the non-optimized version of the code.

In computing, an optimizing compiler is a compiler that tries to minimize or maximize some attributes of an executable computer program. In general, a computer program may be optimized so that it executes more rapidly, or is capable of operating with less memory storage or other resources, or draws less power. Compiler optimization is generally implemented using a sequence of optimizing transformations, i.e., algorithms, which take a program and transform it to produce a semantically equivalent output program that uses fewer resources.

Debugging is the process of finding and resolving bugs or defects that prevent correct operation of computer software or a system. Debugging tends to be harder when various subsystems are tightly coupled, as changes in one may cause bugs to emerge in another. While writing an application, a developer will recompile and test often, and so compilation must be fast. Non-optimized code has a correlation between source code and the object code which enables efficient source level debugging. However, the correlation is not applicable for optimized code. Optimized code is rearranged and modified during the optimization process, which makes it difficult to perform source level debugging. This is one reason most optimizations are deliberately avoided during the test/debugging phase.

SUMMARY

As disclosed herein, a method for debugging optimize code begins by receiving a source code of a program. The method continues by generating a FAT binary containing a binary and an intermediate code corresponding to the received source code. The method continues by determining whether a debugger is enabled, and responsive to determining that a debugger is indeed enabled, loading the generated FAT binary into a memory. A computer program product and a computer system corresponding to the method are also disclosed.

DETAILED DESCRIPTION

Debugging optimized code is a challenging dilemma in software development. Non-optimized code has a correlation between source code and the object code which enables source level debugging. However, the correlation is not applicable for optimized code. Optimized code is rearranged and modified during the optimization process, which makes it difficult to perform source level debugging. As a consequence, developers are left with two options. First, for efficient debugging, the code can be maintained in non-optimized form. Second, if performance is a critical part of the program, the program can be compiled with optimization enabled, but will result in decreased debugging productivity. Furthermore, if optimization is enabled, developers need to recompile their code with non-optimized settings to enable source-level debugging. Embodiments of the present invention provide systems and methods for loading the proper binary based on the current compiler phase, which allows a developer to have an optimized program without being required to rebuild the non-optimized version of the code for the purpose of debugging.

Figure 1:
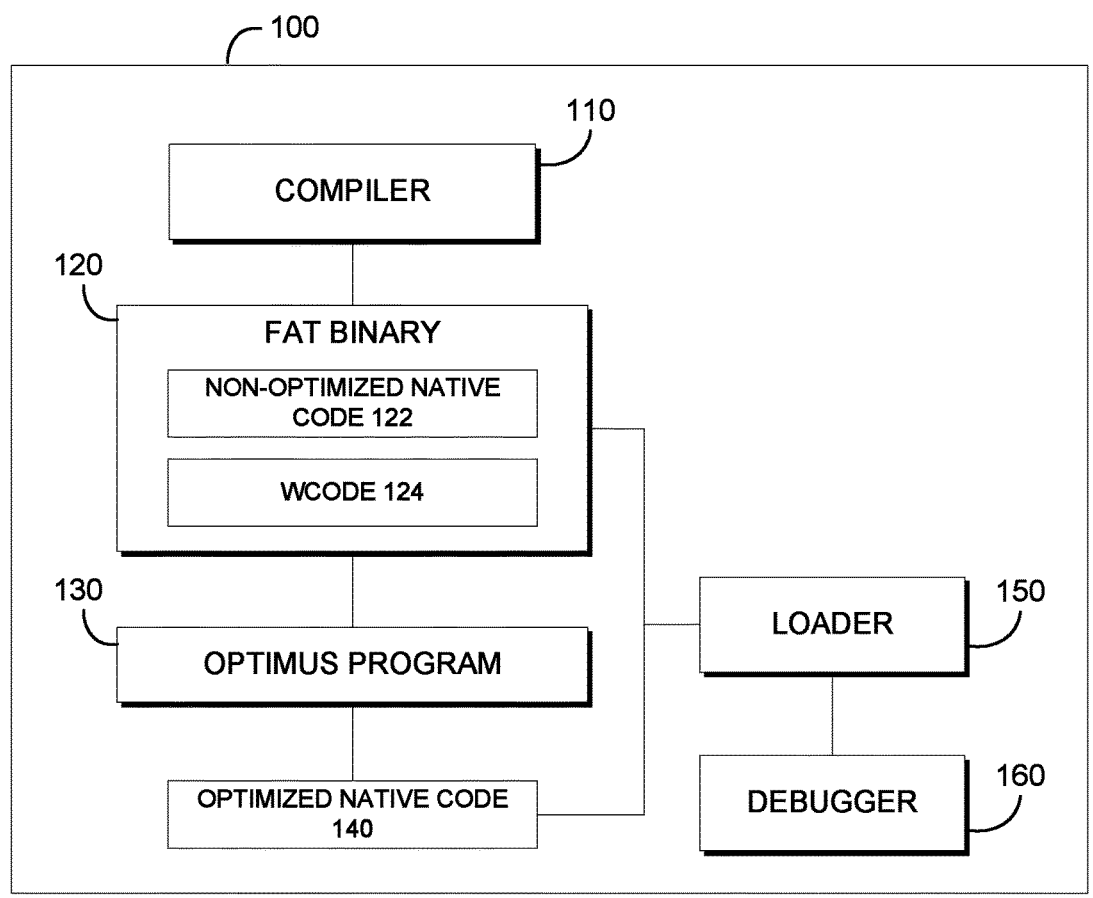
FIG. 1 is a functional block diagram illustrating a computing device, in accordance with an embodiment of the present invention.

The present invention will now be described in detail with reference to the figures. FIG. 1 is a functional block diagram illustrating a computing device 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, computing device 100 includes compiler 110, FAT binary 120, optimus program 130, optimized native code 140, loader 150, and debugger 160.

Compiler 110 is a computer program that transforms source language written in a programming language (source code) into another computer language (object code). Developers compile a program normally in compiler 110. Compiler 110 produces FAT binary 120.

FAT binary 120 is a computer executable program which has been expanded with code native to multiple instruction sets which can consequently be run on multiple processor types. In this exemplary embodiment, FAT binary 120 enables machine-level optimization, which increases the performance of a program. FAT binary 120 decreases turn-around time when there is an issue, or bug, because the developer already has access to a non-optimized version of the code. FAT binary 120 includes a binary, non-optimized native code 122, and an intermediate representation of the program, WCODE 124. Non-optimized native code 122 is executable object code, produced by compiler 110 from a developer-written source code. WCODE 124 is a smaller and obfuscated internal representation of the program's source code. WCODE 124 contains all the semantic information of the source code such that a user can perform optimizations on it as if it were freshly compiled. It should be appreciated that in this exemplary embodiment, WCODE 124 is created for a single processor architecture.

Optimus program 130 is software capable of transforming obfuscated source code into a fully automated native code. Optimus program 130 takes advantage of machine architecture to produce the maximum level of optimization. Optimus program 130 uses WCODE 124 to produce optimized native code 140. Loader 150 loads optimized native code 140 into memory (not depicted in FIG. 1) during live production mode (i.e., operational mode). During debugging mode, loader 150 loads non-optimized native code 122 directly into memory.

Loader 150 places programs into memory and prepares them for execution. Loader 150 is responsible for loading the executable contents of FAT binary 120 into memory and preparing the executable contents to be run. In this exemplary embodiment, loader 150 accesses non-optimized native code 122 and WCODE 124 in FAT binary 120. Loader 150 communicates with debugger 160 to determine which binary to load: either non-optimized native code 122 from FAT binary 120 or optimized native code 140. In this exemplary embodiment, loader 150 loads optimized native code 140 into memory during live production mode. Optimized native code 140 is a fully optimized native code that is tuned for the machine architecture. It should be appreciated that in debugging mode, loader 150 loads non-optimized native code 122 into memory for use by debugger 160 during debugging.

Debugger 160 is a computer program that allows a program to execute and inspects each step during execution (e.g., GNU Debugger). When debugger 160 is enabled, loader 150 will load non-optimized native code 122 into the memory. In one example, a debugging flag can be turned on when debugger 160 is enabled to communicate to loader 150 of the current debugging mode.

Figure 2:
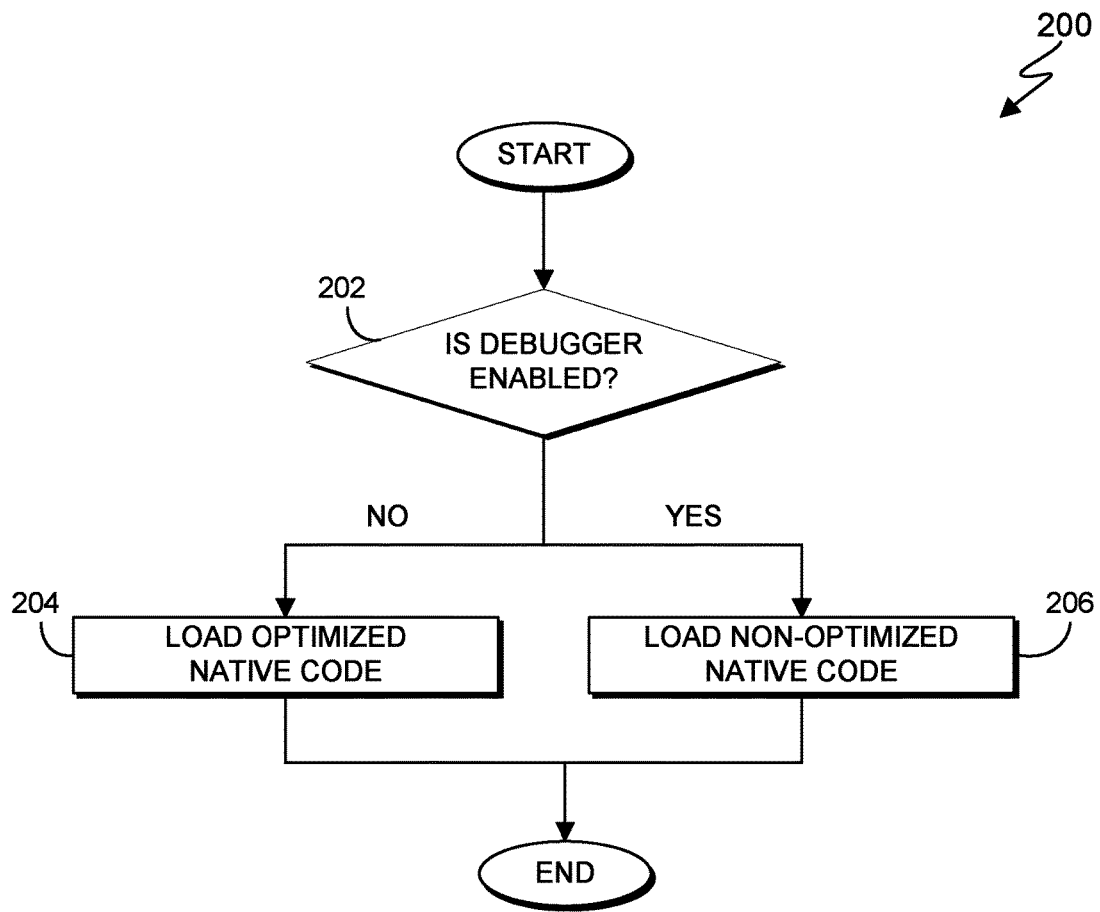
FIG. 2 is a flowchart depicting operational steps for determining the current work mode and loading the binary that provides the best performance, in accordance with an embodiment of the present invention.

FIG. 2 is a flowchart, 200, depicting operational steps for determining the current work mode and loading the binary that provides the best performance, in accordance with an embodiment of the present invention.

In step 202, loader 150 determines if the user is debugging the program. In this exemplary embodiment, loader 150 communicates with debugger 160 to determine if debugging mode is enabled. In one example, when debugger 160 is on, a flag is added to tell loader 150 that the debugging mode is enabled. It should be appreciated that the current work mode can either be debugging mode or live production mode. Loader 150 determines the current work mode and automatically loads the applicable version of the code.

If, in step 202, loader 150 determines that debugger 160 is not in debugging mode (i.e., it is in live production mode), then in step 204, loader 150 loads optimized native code 140 into memory. It should be appreciated that optimus program 130 produces optimized native code 140 from WCODE 124.

If, in step 202, loader 150 determines that debugger 160 is in debugging mode, then in step 206 loader 150 retrieves non-optimized native code 122 from FAT binary 120. Loader 150 loads non-optimized native code 122 into memory for use by debugger 160 during the debugging process.

Accordingly, by performing the operational steps of FIG. 2, a developer can build a code with optimization turned on, without the need to rebuild the code without optimization for debugging purposes. By using a FAT binary, loader 150 can automatically load a non-optimized native code during the debugging process, so that the code does not need to be rebuilt for debugging purposes. This invention creates the option for developers to access the non-optimized native code for debugging that is stored within the release version of a program.

Figure 3:
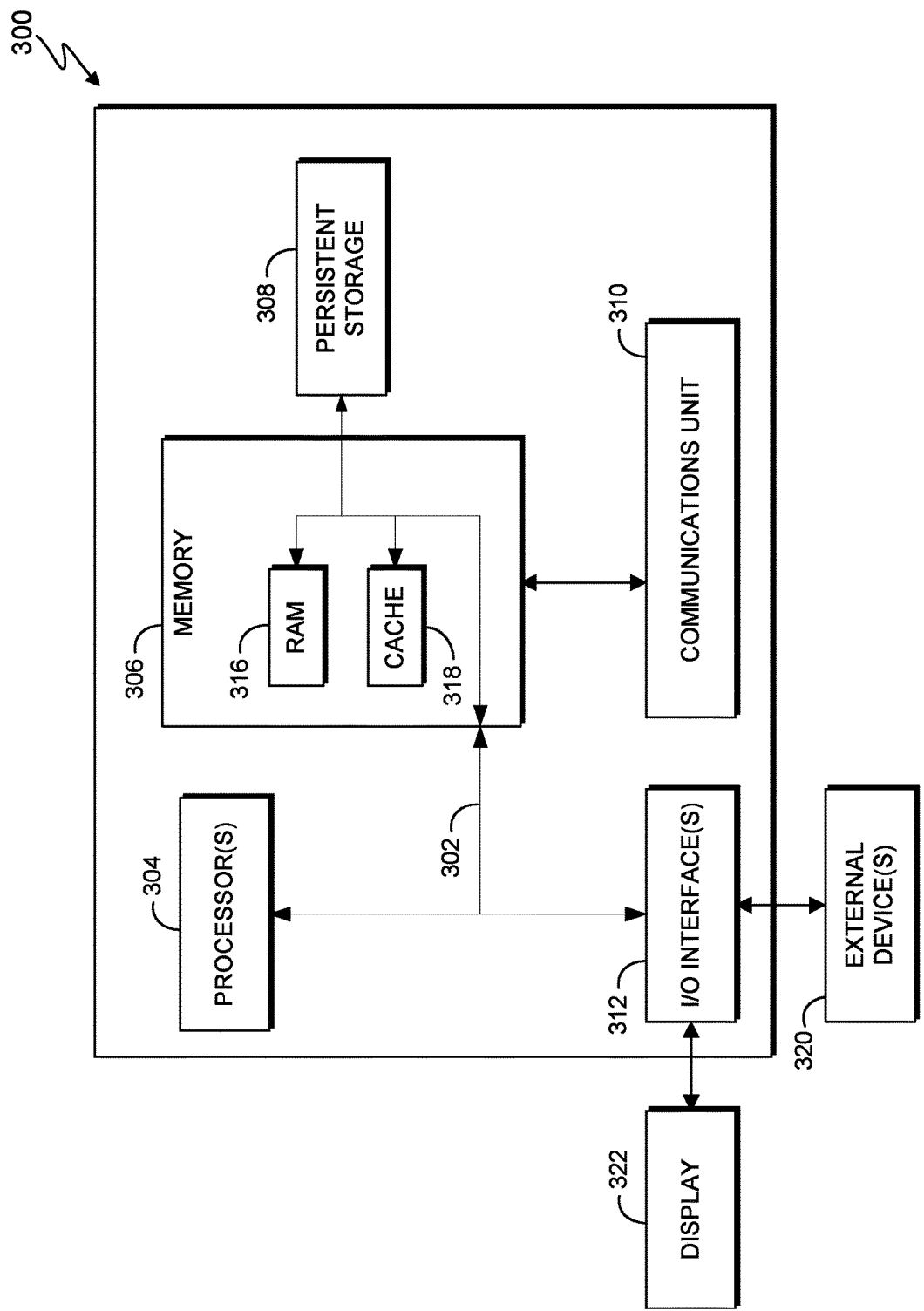
FIG. 3 is a block diagram of internal and external components of a computer system, in accordance with an embodiment of the present invention.

FIG. 3 is a block diagram of internal and external components of computing device 300, which is representative of the computing device of FIG. 1, in accordance with an embodiment of the present invention. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 300 includes communications fabric 302, which provides for communications between one or more processing units 304, memory 306, persistent storage 308, communications unit 310, and one or more input/output (I/O) interfaces 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310 provides for communications with other computer systems or devices via a network. In this exemplary embodiment, communications unit 310 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 300 through communications unit 310 (i.e., via the Internet, a local area network, or other wide area network). From communications unit 310, the software and data can be loaded onto persistent storage 308.

One or more I/O interfaces 312 allow for input and output of data with other devices that may be connected to computing device 300. For example, I/O interface 312 can provide a connection to one or more external devices 320 such as a keyboard, computer mouse, touch screen, virtual keyboard, touch pad, pointing device, or other human interface devices. External devices 320 can also include portable computer readable storage media such as, for example, thumb drives, portable optical or magnetic disks, and memory cards. I/O interface 312 also connects to display 322.

Display 322 provides a mechanism to display data to a user and can be, for example, a computer monitor. Display 322 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for debugging optimized code, the method comprising the steps of:
   in response to receiving a source code of a program, generating, by one or more processors, a FAT binary, wherein the FAT binary contains a binary and an intermediate code;
   determining, by one or more computer processors, whether a debugger is enabled;
   in response to determining that the debugger is not enabled, passing, by one or more computer processors, the intermediate code to a program;
   in response to passing, by one or more computer processors, the intermediate code to the program, generating, by the program, an optimized native code;
   in response to generating an optimized native code, loading, by one or more computer processors, the generated optimized native code; and
   wherein:
      the binary is a non-optimized native code for a single processor architecture;
      the intermediate code is an internal representation of the source code, and contains all semantic information of the source code, thereby enabling a user to perform optimizations on the intermediate code;
      loading the generated binary into a memory is based on a determination of an enhanced loader whether to load a non-optimized native code or an optimized native code;
      the optimized native code is optimized source code for a single processor architecture; and
      the program transforms the intermediate code into the optimized native code.

* * * * *